Feb. 24, 1970    K. Y. KONNO    3,496,778
PORCELAIN MEASURING DEVICE
Filed Oct. 23, 1967
FIG. 1
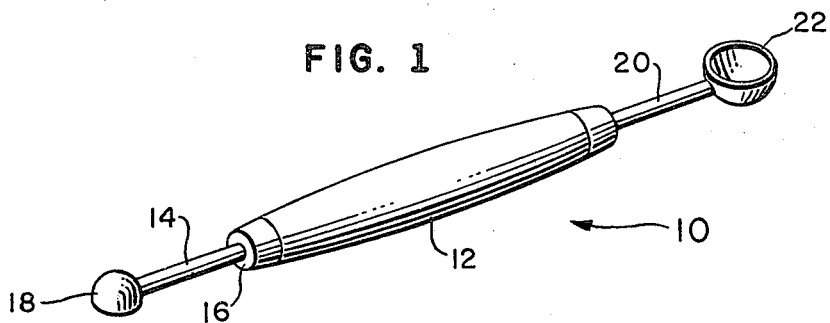
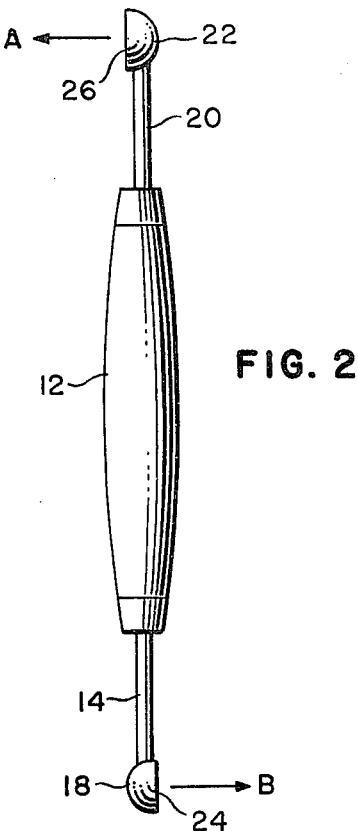
FIG. 2
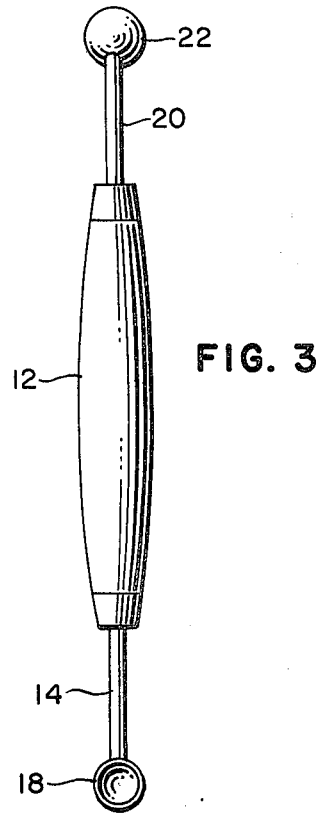
FIG. 3
INVENTOR:
KANE Y. KONNO
BY Michael D. Borsella
ATTORNEY.

United States Patent Office 3,496,778
Patented Feb. 24, 1970

3,496,778
PORCELAIN MEASURING DEVICE
Kane Y. Konno, 32—76 32nd St.,
Astoria, N.Y. 11102
Filed Oct. 23, 1967, Ser. No. 677,337
Int. Cl. G01f 19/00
U.S. Cl. 73—426                              2 Claims

ABSTRACT OF THE DISCLOSURE

Simply stated, the within invention contemplates providing a volumetric measuring device comprising a plurality of substantially semi-spherical open receptacles, attached to common supporting apparatus. The volumes of the receptacles or measuring containers in the illustrative embodiment herein shown, are in the ratio of .175 to .0875 cubic inch. The sizes of the herein illustrated receptacles provide absolute optimum measuring units for ceramic powders and particularly for porcelain powder in the mechanical dentistry field.

---

The present invention deals with measuring devices and more particularly of the type adapted to measure finite amounts of porcelain powders in mechanical dentistry applications.

OBJECTS OF INVENTION

It is one of the objects of the present invention to provide a novel measuring device of great utility in measuring finite amounts of ceramic powders.

Another object of the invention is to provide an optimum measurement for a finite amount of porcelain powder in the mechanical dentistry field.

Still another object of the invention is to provide a measuring device for a finite amount of porcelain powders, embodying a pair of receptacles in the volumetric ratio of .175 to .0875 cubic inch.

Another object of the invention is to provide a measuring device of the above indicated nature which shall be simple and economical to manufacture and yet positive and reliable in use.

Another object of the invention is to provide a measuring device for porcelain powder in the mechanical dentistry field containing the absolute optimum volumetric measurements based upon findings during thirty-five years of experience and experimentation with such measurements.

The foregoing, and further objects and advantages will appear more fully hereinafter from a consideration of the detailed description which follows, taken together with the accompanying drawing, wherein one embodiment of the invention is illustrated by way of example, it is to be expressly understood however, that the drawing is for the purpose of illustration only and is not to be construed as defining the limits of the invention.

FIELD OF THE INVENTION AND PRIOR ART

It will be noted that the primary field of this invention resides in the mechanical dentistry field, wherein it is required to measure out finite volumetric quantities of ceramic powders, such as porcelain powder, enamels, or body cutters, or coloring agents in the making of false teeth, caps and the like, bridges and dental rehabilitation.

I have found, based upon thirty-five years of experience and experimentation in said field that a measuring device of the greatest utility and which provides the optimum and most frequently employed measurement for the amount of porcelain powder required in the construction of false teeth, caps, and crowns is one embodying a pair of substantially semi-spherical receptacles capable or measuring out a maximum of .175 and .0875 cubic inch of the above identified powders respectively.

Heretofore in the art, the usual methods of measuring out porcelain and other powder in the mechanical dentistry field was at times by means of a spoon, and estimating by eye the amount of powder to be poured thereon. At other times any available receptacle was employed in like manner.

There are no devices on the market or in the trade capable of accurately measuring the optimum amounts of porcelain and other powder required in most applications in the art. The present device provides such measurements.

In the drawings wherein like reference characters designate like parts:

FIG. 1 is a perspective view of the measuring device of this invention.

FIG. 2 is a side view of the measuring device of this invention.

FIG. 3 is a front view of FIG. 2.

DESCRIPTION OF PREFERRED EMBODIMENTS

Referring now to FIG. 1, there is shown a novel measuring device assembly generally designated by the numeral 10 comprising a central substantially elongated support or handle 12. The support 12 is preferably, although not essentially, round in cross-section and provides a convenient means in use for grasping the device. A supporting member 14 extends in rectilinear manner from one end 16 of the support 12 and has attached on the extremity thereof a substantially semi-spherical measuring cup or receptacle 18.

The opposite end of the member 12 has extending therefrom in like manner a second supporting member 20. Thus the supporting members 14 and 20 and the handle 12 are disposed in substantially rectilinear manner. The member 20 has attached on the opposite extremity thereof a second measuring cup or receptacle 22. The receptacle 22 is substantially semi-spherical in contour and of such size that its maximum volumetric content is .175 cubic inch. The maximum volumetric content of the measuring cup or receptacle 18 is .0875 cubic inch.

The semi-spherical cup 18 has an opening 24 and the semi-spherical cup 22 has a corresponding opening 26 (FIG. 2). The openings 24 and 26 are in opposite and inverted relationship to one another. That is to say, they face in opposite directions 180 degrees apart, such as indicated by arrows A and B (FIG. 2). Such configuration provides an easier use of the device and insures that the correct cup is selected for measuring purposes.

The receptacle 18 is adapted to measure out a maximum volumetric amount of porcelain powder of .0875 cubic inch while the receptacle or measuring cup 22 is adapted to measure out a maximum volumetric amount of .175 cubic inch. I have discovered these to be the optimum and most frequently used measurements for ceramic powder in mechanical dentistry work and the making of false teeth, caps and crowns and the like, bridges and dental rehabilitation.

Thus, there is provided a convenient and utile measuring device which fulfills the various objects of this invention.

While only one preferred embodiment of the invention has been illustrated and described, it will be obvious to those skilled in the art that modifications may be made and changes in the relative arrangement of the parts without departing from the scope and spirit of the invention.

What is claimed is:

1. A measuring device assembly for a finite amount of ceramic powder adapted for use in the mechanical dentisty field, comprising a central support, a member extending from one end of said support, a second member extending from the opposite end of said support, a first semi-spherical volumetric measuring cup on the end of said member for measuring a first ceramic powder, a second semi-spherical volumetric measuring cup on the end of the second member for measuring a second ceramic powder, said first volumetric measuring cup on the end of said member being one half the volume of the second volumetric measuring cup, the volume of of said first measuring cup being .0875 cubic inch.

2. The measuring device assembly claimed in claim 1 wherein said volumetric measuring cup has an opening facing in one direction and the second volumetric measuring cup has an opening facing in the opposite direction.

References Cited

UNITED STATES PATENTS

| 2,595,101 | 4/1952 | Russell | 73—426 |
| 2,683,374 | 7/1954 | Finley | 73—426 |

LOUIS R. PRINCE, Primary Examiner

DANIEL M. YASICH, Assistant Examiner